US007000879B2

(12) United States Patent
Gonzales

(10) Patent No.: US 7,000,879 B2
(45) Date of Patent: Feb. 21, 2006

(54) CAMERA STABILIZER

(76) Inventor: Rolando Gonzales, 8981 Helenjames Ave., San Diego, CA (US) 92126

( * ) Notice: Subject to any disclaimer, the term of this patent is extended or adjusted under 35 U.S.C. 154(b) by 8 days.

(21) Appl. No.: 10/671,977

(22) Filed: Sep. 26, 2003

(65) Prior Publication Data

US 2005/0067543 A1 Mar. 31, 2005

(51) Int. Cl.
*A47F 1/10* (2006.01)
(52) U.S. Cl. .................... 248/298.1; 224/185; 352/243; 396/420; 396/421
(58) Field of Classification Search ............ 248/298.1, 248/241, 255, 256, 253, 188.5; 224/908, 224/265, 185, 191, 242, 909, 139; 352/243; 354/293; 396/420, 421
See application file for complete search history.

(56) References Cited

U.S. PATENT DOCUMENTS

| 2,552,205 A | 5/1951 | Moss .......................... 95/86 |
| 2,753,778 A * | 7/1956 | Tolcher ..................... 294/139 |
| 2,806,416 A | 9/1957 | Jones ............................ 95/86 |
| 4,244,500 A | 1/1981 | Fournier ..................... 224/265 |
| D302,561 S | 8/1989 | Goins ........................ D16/242 |
| 4,943,820 A | 7/1990 | Larock ......................... 354/82 |
| 5,332,136 A | 7/1994 | Rudolph ..................... 224/185 |
| D382,286 S | 8/1997 | Doran ....................... D16/242 |
| 6,517,133 B1 * | 2/2003 | Seegmiller et al. ......... 294/139 |

FOREIGN PATENT DOCUMENTS

EP 0122332 A1 10/1984

OTHER PUBLICATIONS

Advertisement for Camera Supports, B.H. Photo Video [www.bhphotovideo.com]. Mar. 2003.

* cited by examiner

*Primary Examiner*—Ramon O Ramirez
(74) *Attorney, Agent, or Firm*—Frank G. Morkunas

(57) ABSTRACT

A camera stabilizer having a base onto which a camera is mountable. Two support members attach to the base by adjustable rods on each support member. A leveling device on the stabilizer permits a user to obtain a horizontally true picture. A mirror on the stabilizer permits a user to direct an external remote control device from the rear, onto the mirror, and reflected into a photosensor on the camera.

52 Claims, 4 Drawing Sheets

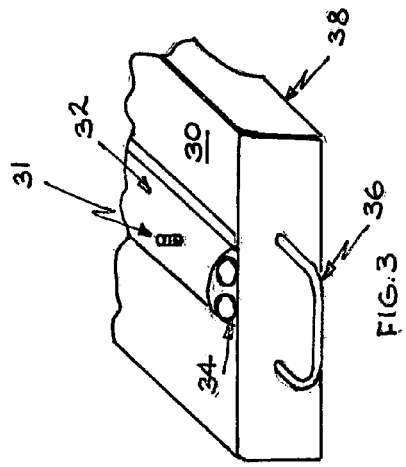
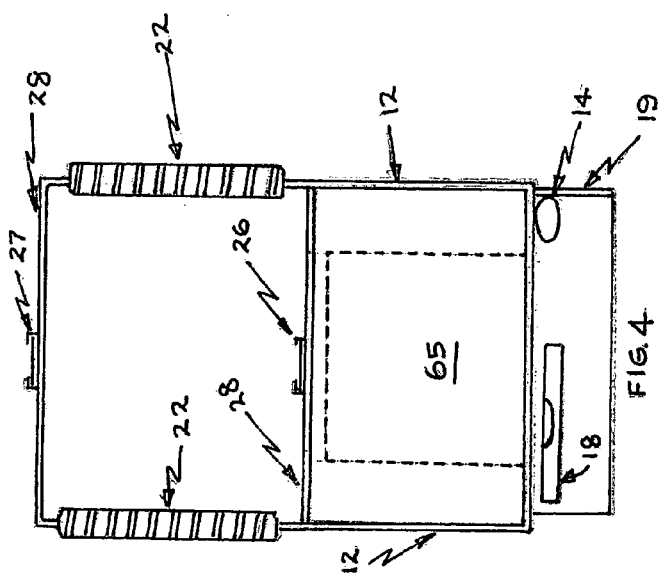
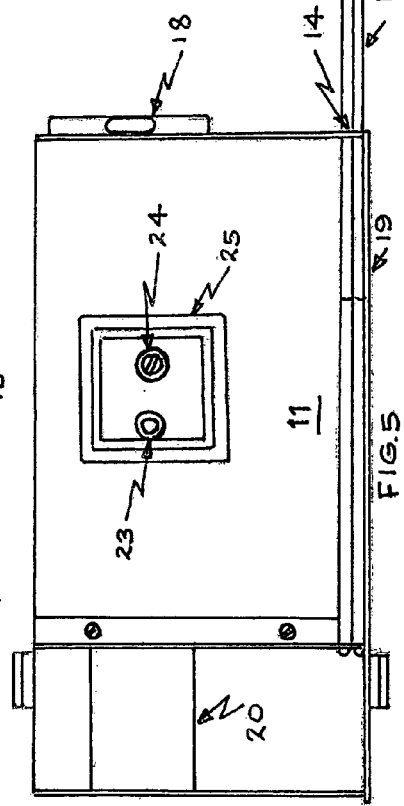

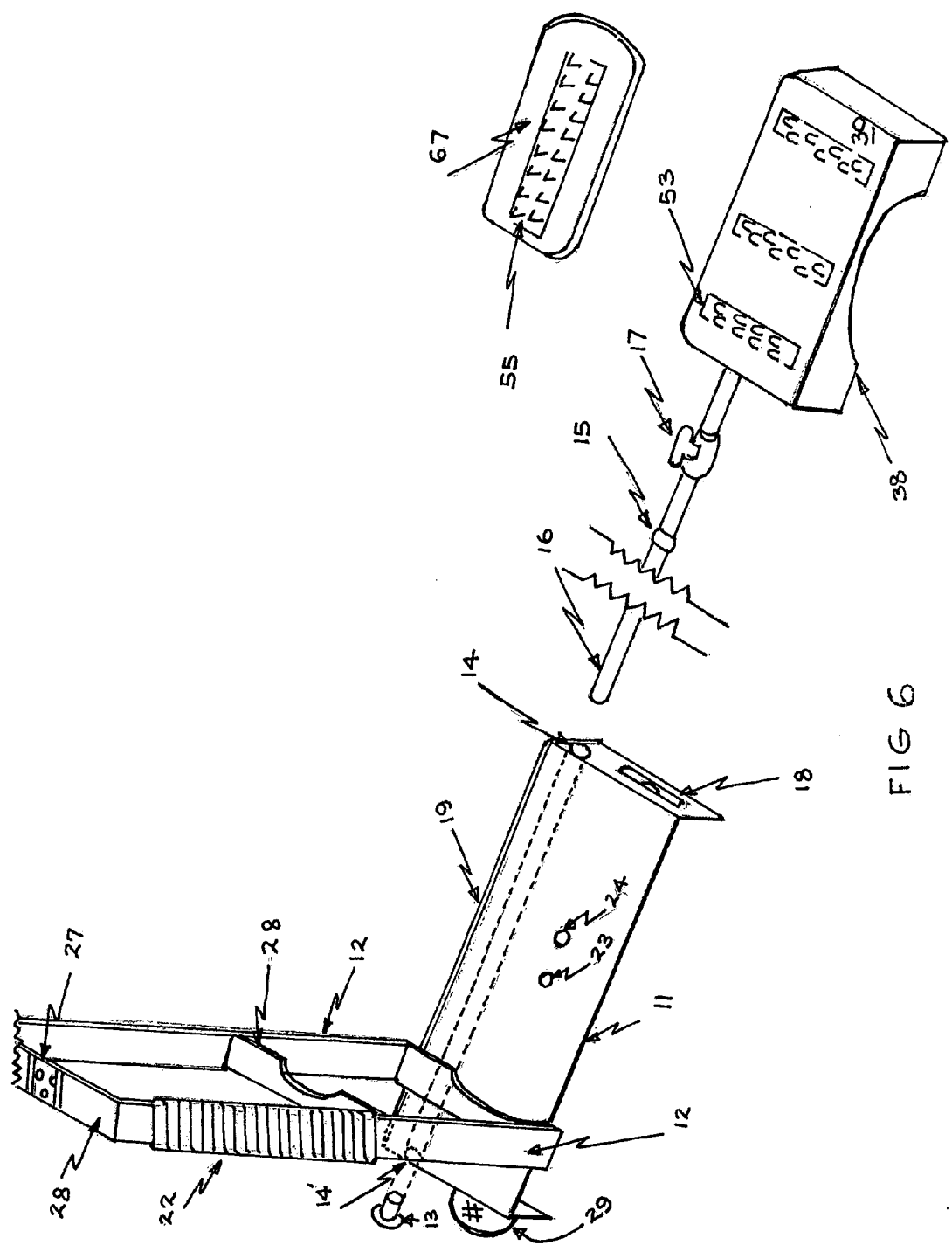

CAMERA STABILIZER

CROSS REFERENCES TO RELATED APPLICATIONS

None.

STATEMENT REGARDING FEDERALLY-SPONSORED RESEARCH OR DEVELOPMENT

None.

BACKGROUND OF THE INVENTION

This present invention relates to an improvement in camera supports and more particularly to camera stabilizers.

A steady camera for still pictures or moving pictures [movie camera or video camera] makes for better more professional finished pictures. A camera for still pictures, because of its shutter speed, can be hand-held and still be capable of capturing a good quality picture. For more professional results, tripods are generally used.

Holding a moving camera or video camera by hand to capture moving pictures can typically yield a 'jittery' result [for the purpose of all further discussion, such moving pictures will be referred to herein as 'video' and the device as 'video camera' and includes all types of cameras capable of capturing and presenting moving pictures—it must be understood, however, that the camera stabilizer of the present invention may be used with all types of cameras; still, moving, 35 mm, digital, and the like]. Tripods can be used but, once set up, their use is limited in scope in that once the tripod is set on the ground, it generally stays put and the camera operator swivels the mounted camera up and down and back and forth as needed. Should an event require the camera operator to move about to better capture the moments, the end result of the video will be jittery.

Various, more portable and mobile, camera supports and stabilizers have been crafted to meet the needs of the video camera operator to minimize or completely eliminate the jitter effect when recording moving events and moving with the event to better capture it. Most typically involve some form of adjustable rod attachable to the video camera with some form of support structure[s] mountable onto a camera operator. In many different forms, these generally involve some form of telescoping rod from video camera to the operator at or near the operator's shoulder with another telescoping rod from video camera to the operator at or near the operator's waist or chest thereby forming a triangular support structure well-suited for stabilizing the video camera.

All the prior art camera support devices are either complicated in structure and use; costly to manufacture and, concomitantly, costly to buy; and, in spite of the complexities of the device and high cost, do not offer flexibility of use nor do they provide for greater versatility in use. Most merely support the video camera without according the user more features necessary to produce more professional results. The present invention fills that void.

Accordingly, several objects and advantages of my invention are to:

a. provide an advantage for near- and far-sighted users to permit either to easily use either an LCD monitor for viewing or the viewfinder of the video camera;

b. produce an inexpensive camera stabilizer which provides excellent vertical and horizontal support for a video camera;

c. introduce a camera stabilizer which easily assembles and dis-assembles;

d. provide for a camera stabilizer which is easily adjustable and extremely easy to use;

e. provide a camera stabilizer which facilitates the use of remote control devices and other camera-related components;

f. create a camera stabilizer which assists the camera operator in registering a level plane; and g. make an easily portable and storable camera stabilizer capable of easy storage and movement from one site to another site.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a camera stabilizing device which has a base onto which a camera is mountable and two support members attached to the base. Each support member has adjustable rods. The camera stabilizer also has a leveler, means for holding a remote device for the camera, and a mirror to reflect the signal from the remote control device to the camera. Each rod on the each support member is adjustable and lockable into its desired position. Support handles on the base, with gripping members, aid a user in grasping the camera stabilizer and in maneuvering it without adversely affecting the stability of the camera.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 3 is a partial perspective view of the support component of FIG. 2.

FIG. 4 is rear elevation view of the base component of the camera stabilizer.

FIG. 5 is a bottom plan view of the base component of FIG. 4.

FIG. 6 is a perspective view of the base and one support component of a second embodiment of the camera stabilizer.

DETAILED DESCRIPTION OF THE INVENTION

Figure 1:
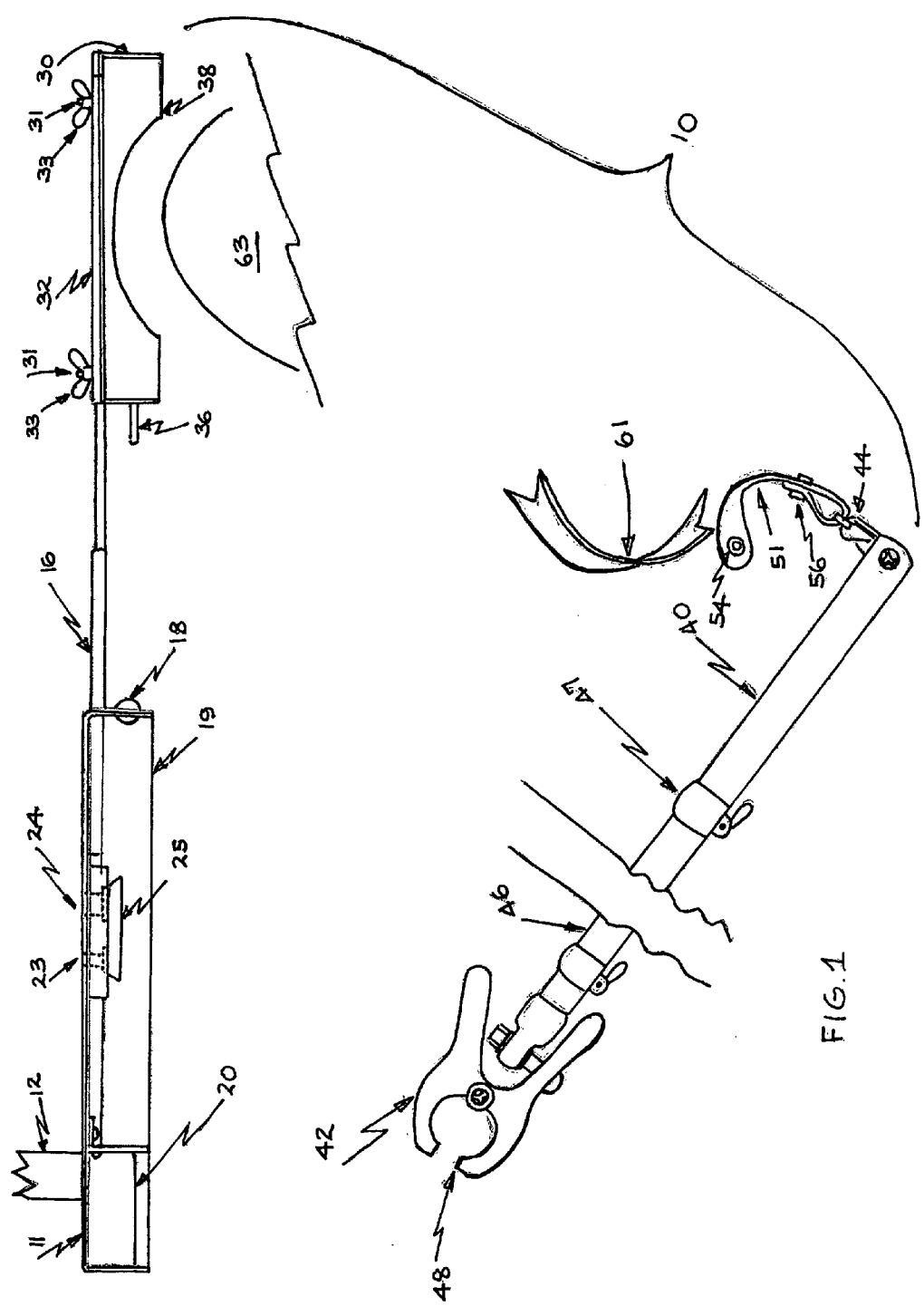
FIG. 1 is a side elevation view of the camera stabilizer.

Referring now to the drawings in detail and in particular to FIG. 1, reference character 10 generally designates a camera stabilizer constructed in accordance with a preferred embodiment of the present invention. The base component 11 supports and secures a camera. Most cameras have a threaded aperture on their bottom for mounting the camera onto a tripod for example. In this regard, the camera may be placed on top of the base 11, aligned with aperture 24, and secured thereon by a correspondingly threaded bolt.

Additionally a tripod mounting shoe 25, with its threaded bolt, may be incorporated onto the bottom of the base 11, to accept and secure a camera mounted onto the top of the base 11. The tripod mounting shoe 25 envisioned for this purpose is a conventional quick-release tripod mounting shoe; i.e., one which easily attaches to and releases from a tripod by movement of a single lever and, concomitantly, easily attaches to and releases from the bottom of the base 11. Most such tripod mounting shoes 25 also have an alignment guide-pin which, when placed onto the tripod, align with a receiving aperture on the tripod thereby registering the fit of the tripod mounting shoe onto the tripod.

To accommodate such guide-pins, the base 11 is configured with an alignment aperture 23. This permits easy attachment of the tripod mounting shoe 25 onto the bottom of the base 11 and for easy and quick securement of a camera to the top of the base 11. At the rear of the base 11, and visible to a user, is leveling device 18, such as, but not limited to a bubble-type level. At or near to the front of the base 11 is a reflective device 29 [illustrated in FIG. 6] the purpose of which is to reflect the transmission of a signal from a remote control device for an external object [e.g., a video camera] to that external object [the video camera].

A side plate 19 extending downward from the base 11 provides support and comfort for a user's hand. Typically video cameras have a strap on the side of the video camera into which a user may insert the user's fingers with the palm-side against the video camera. Also, typically, the thumb of the user is outside of the strap. The side plate 19 provides a place to support the user's hand when the hand is inserted into the strap of the video camera. This side plate 19 also permits the user to better manipulate the video camera as attached to the base 11. This side plate 19 may, but need not, run the full length of the base 11 from front to rear.

When the camera stabilizer 10 is fully assembled, with camera attached, and is attached to the user 63, this permits a user to establish a perfect horizontal plane when the situation may call for such.

An adjustable rod member 16 extends from the rear of the base 11 to a support member 30. Support member 30 is adapted to rest on the user's 63 shoulder. As illustrated it is contoured on the bottom 38 to fit onto the user's shoulder. This contoured bottom 38 should be made of a soft or pliable material to provide a cushioned support and comfort for the user.

Another support member 40 is adapted to attach at one end 48 to an attachment member 20 on the bottom of the base 11 and at the other end 44 to attach to the user. This support member 40 has at one end 48 a clamping member 42 which is removably securable to the attachment member 20. At the other end 44 of this support member 40, there is a fastening member 51 which is adapted to fasten to the belt 61 or, if the user is belt-less, to any strap-like member provided to and worn by the user 63.

Figure 7:
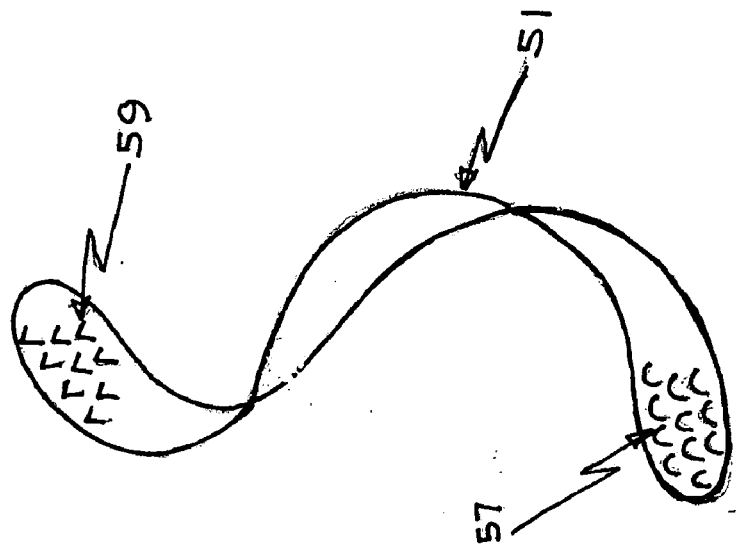
FIG. 7 is a detailed view of fastening components for the camera stabilizer.

The fastening member 51 may have corresponding snap tabs 54, 56 or, as illustrated in FIG. 7, corresponding hook-and-loop 57, 59 fastening components. Any suitable fastening component will suffice. What is important is that the fastening member 51 be fastenable to the user 63 at approximately the waist or chest level to provide that sturdy triangular support created by using the camera stabilizer 10.

This support member 40 also may have an adjustable rod member 46 which, after suitable back and forth adjustment as necessary to the user, may be locked into position by the locking member 47 on this adjustable rod 46. Each end point 48, 44, in relation to the rod 46 may swivel. This swivel feature permits the user to freely move about, twist and turn, as necessary without adversely affecting the stability of or support for the mounted camera.

Therefore, with the camera mounted on the base 11; the shoulder support member 30 [or first support member], with its weight and the weight of the camera, resting on the user 63; and the waist/chest support member 40 [or second support member] attached to the bottom of the base 11 at one end 48 and to the user 63 at the other end 44; the user may easily adjust the distances necessary, back and forth, for proper use as to base 11 to first support member 30 and adjust the distances necessary, back and forth, for proper use as to base 11 to second support member 40.

Figure 2:
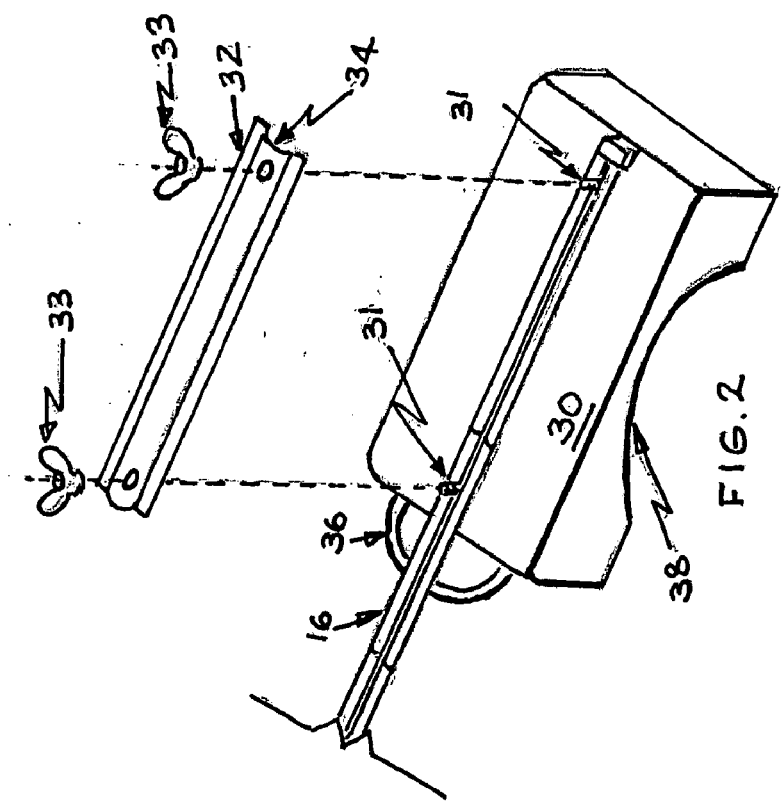
FIG. 2 is a detailed exploded view of one support component of the camera stabilizer.

FIGS. 2–5 illustrate additional features of this embodiment with FIG. 2 illustrating the details of the first support member 30. In this embodiment, the rod 16 attaches to and is removable from the first support member 30. The purpose here is that, once the camera stabilizer 10 is fully disassembled, it is easy to store and easy to move from site to site as necessary. Once the rod 16 is detached from the first support member 30, the rod 16 may be pushed from the rear through the rear receiving aperture 14 into the bottom of the base 11. Removing the second support member 40 from the base 11 and pushing its opposing ends toward each other, minimizes its volume. This leaves three individual component parts [base 11, first support member 30, and second support member 40] to easily store and transport.

On the top of the first support member 30 is a housing 32 which is removable. It is removed before the rod 16 may be secured to the first support member 30. One or more rods 16 may emanate from the base 11. Two are shown in this illustration. The rods 16 of this illustration are placed on top of the first support member 30 on each side of a fastener 31. The fastener 31 shown here is a threaded stud of which there are two illustrated. One or more such threaded studs 31 will suffice. Once the two rods 16 are placed on each side of the threaded stud 31, the housing 32 is placed on top of the first support member 30 and, by such placement, covers the two rods 16.

The housing 32 has apertures which correspond to the threaded studs 31 and which protrude from the housing 32 [after its placement on top of the first support member 30] to accept correspondingly threaded fasteners 33 [shown here as wing nuts]. The correspondingly threaded fasteners 33 are tightened such that the rods 16 are secured to the first support member 30. If only one rod 16 is used, it would have apertures therethrough which correspond to the threaded studs 31. In such case, though the housing 32 would not be necessary, it may still be applied for the purpose of receiving and holding an external object [such as a remote control device].

The front of the housing 32 through to the rear of the housing 32 creates a receiving member 34 for the rod[s] 16. Also, at the front of the first support member 30, below the receiving member 34 is an adjustment member 36 adapted to be grabbed, grasped, or gripped by the user with any suitable digit or digits of the user's hand and, once so done, is used to pull the first support member 30 toward the base 11 as a means of adjusting the distance between the first support member 30 and the base 11. As shown, the adjustment member 36 is a U-type extension extending from the front of the first support member 30 and having a space therein into which the user may insert a thumb or any finger and, while holding the base 11, pull the first support member 30 toward the base 11 as needed.

FIG. 4 illustrates yet additional features of the camera stabilizer 10. This figure highlights the features of the base 11 as viewed from the rear. The level 18 is at the rear. Also at the rear is a receiving aperture 14 into which the rod 16 enters the base 11. An external object [camera] is illustrated in phantom line as reference character 65. Extending upward from the base 11 is a support handle 12. One or more such support handle 12 may extend upward from the base 11.

The purpose of the support handle 12 is to aid the user in holding, gripping, and maneuvering the camera to and toward objects of interest to be captured on film. Two such support handles 12 are shown and at least two are best suited for the intended purpose. One or more vertically disposed extension 28 extend from the support handle 12 on one side of the base 11 to the support handle 12 on the opposite side of the base 11. A camera accessory mounting shoe 26, 27 may be on any one or more of the vertical extensions 28. These mounting shoes 26, 27 are adapted to receive any conventional camera accessory such as, but not limited to, a flash and a light meter.

It is preferred that there be at least two support handles 12 and that there be at least two vertical extensions 28 connecting to each support handle 12 as illustrated in FIG. 4. A gripping member 22 may be on either or both support handles 12. It is best that the gripping member 22 be soft and not slick for its purpose is to permit the user to obtain a sure grip on the camera stabilizer 10. This gripping member may be foam [covered or uncovered], cushion, tape, rope, or string and it may be made of any material suited for the intended purpose.

FIG. 6 illustrates another embodiment of the camera stabilizer 10 as it relates to the first support member 30 and the base 11. In this embodiment, the rod 16 is permanently affixed to the first support member 30 and telescopes back and forth to and from the front of the first support member 30. To assemble the camera stabilizer 10 for use, the user would extend the rod 16 out from the first support member 30 and insert the far end of the rod 16 through the rear receiving aperture 14 and through and past the front receiving aperture 14' leaving the far end of the rod exposed outward from the front of the base 11.

A rod stopper 15 on the rod 16 prevents the rod 16 from traveling any farther through either aperture 14, 14' than intended. The intended distance of travel is such that the far exposed end of the rod 16 protrudes from the front end of the base 11 through the front receiving aperture 14' to a point which the end cap or stopper 13 may be inserted over the exposed far end to prevent undesired backward movement of the rod 16. With the rod stopper 15 preventing forward movement and the end cap stopper 13 preventing backward movement, the rod 16 is securely attached to the base 11. Once so secured, the distance between base 11 and first support member 30 may be made and, with a locking device 17 on the rod 16, so locked in place.

With this embodiment, the first support member 30 also may have on its top, a coupling component 53 onto which an external object may be attached [similarly, the housing 32 discussed previously also may have a coupling component 53 onto which an external object may be attached]. If a video camera 65 is used as the object supported on the base 11, a suitable external object for the video camera 65 may be a remote control device 67. The coupling component 53 of choice is hook-and-loop. As illustrated the loop element is represented by reference character 53 and is on the first support member 30 while the hook element is represented by reference character 55 and is on the remote control device 67 [though the corresponding coupling components may be reversed; i.e., hook element on the first support member 30, loop element on the remote control device 67].

For many video cameras, having the remote control 67 positioned as such simplifies the operation of the camera in that, the controls on the video camera itself for many video cameras are not well placed for ease of operation with or without use of a tripod or camera stabilizer or support. Remote control devices 67, on the other hand, are more user-friendly. Therefore, having the capability of using a remote control device 67 with a video camera 65 mounted onto the camera stabilizer 10 of the present invention clearly simplifies use of the video camera 65 in conjunction with the camera stabilizer 10.

The reflective device [mirror] 29 permits this to happen. The remote control device 67 must be placed and positioned onto the first support member 30 such that the signal the remote control device 67 transmits can be reflected off the mirror 29 and onto the photosensor of the receiving component; i.e., the camera 65 of such signal.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

What is claimed is:

1. A camera stabilizer for use with a camera, said camera stabilizer comprising:

a base having a top, a bottom, a front, and a rear;

a first rod extendable from said base;

first support means for providing support for the base, said first support means attached to said first rod, wherein said first rod is a telescoping rod permanently attached to said first support means and wherein said base comprises a receiving aperture at its rear adapted to receive said first rod therethrough and a second receiving aperture at its front adapted to receive said first rod therethrough to thereby stabilize said first rod onto said base;

second support means for providing support for the base, said second support means comprising a second rod attached to and extending from said base;

leveling means on said base for establishing a proper horizontal frame of reference an attaching member on the bottom of said base, said attaching member adapted to receive said second support means; and wherein said second support means further comprises a telescoping rod having at one end a clamping device adapted to securingly attach to said attaching member and having at a second end a means for attaching said second end to a user.

2. The camera stabilizer in claim 1 further comprising one or more upstanding handles on said base.

3. The camera stabilizer in claim 2 further comprising gripping means on said one or more upstanding handles, said gripping means for aiding a user in holding and supporting the camera stabilizer.

4. The camera stabilizer in claim 2 further comprising one or more vertically disposed extensions on said one or more upstanding handles.

5. The camera stabilizer in claim 4 further comprising a mounting shoe on one or more of said one or more vertically disposed extensions.

6. The camera stabilizer in claim 1 wherein said one end is swivelable on said telescoping rod.

7. The camera stabilizer in claim 1 wherein said second end is swivelable on said telescoping rod.

8. The camera stabilizer in claim 1 wherein said first rod is a telescoping rod permanently attached to said base and wherein said first support means further comprises a receiving member on said first support means wherein said receiving member is adapted to receive and secure said first rod therein.

9. The camera stabilizer in claim 8 wherein said first support means further comprises an adjustment member on its front end adapted to facilitate telescoping movement, back and forth, of said first rod.

10. The camera stabilizer in claim 1 further comprising an attachably removable stopper adapted to securely fit over an exposed end said first rod, said exposed end extending frontward of said base through said second receiving aperture.

11. The camera stabilizer in claim 10 further comprising a second stopper on said first rod, said second stopper adapted to fit onto said first rod at a point which prevents said first rod from moving forward after insertion into said receiving aperture and permitting the exposed end to pass through said second receiving aperture.

12. The camera stabilizer in claim 1 wherein said first rod comprises a locking device thereon to lock said first rod into any position into which said first rod is telescoped.

13. A camera stabilizer for use with a camera, said camera stabilizer comprising:

a base having a top, a bottom, a front, and a rear;

a first rod extendable from said base, wherein said first rod is a telescoping rod permanently attached to said base;

first support means for providing support for the base, said first support means attached to said first rod, wherein said first support means further comprises a receiving member on said first support means, said receiving member adapted to receive and secure said first rod therein and further comprises an adjustment member on its front end adapted to facilitate telescoping movement, back and forth, of said first rod;

second support means for providing support for the base, said second support means comprising a second rod attached to and extending from said base; and reflection means for reflecting and directing a photosensor transmitting signal from a remote control device for the camera to a corresponding photosensor receiver on the camera.

14. The camera stabilizer in claim 13 wherein said reflection means comprises a mirror attached to the front of said base.

15. The camera stabilizer in claim 13 further comprising a tripod mounting shoe attachable to the bottom of said base.

16. The camera stabilizer in claim 13 wherein said first support means is comprised of a soft material and is contoured to fit on a user's shoulder.

17. The camera stabilizer in claim 13 wherein said first support means further comprises a coupling means for receiving and securely holding an external object.

18. The camera stabilizer in claim 13 further comprising leveling means on said base for establishing a proper horizontal frame of reference.

19. The camera stabilizer in claim 18 wherein said leveling means comprises a bubble level at the rear of said base.

20. The camera stabilizer in claim 13 further comprising one or more upstanding handles on said base.

21. The camera stabilizer in claim 20 further comprising gripping means on said one or more upstanding handles, said gripping means for aiding a user in holding and supporting the camera stabilizer.

22. The camera stabilizer in claim 20 further comprising one or more vertically disposed extensions on said one or more upstanding handles.

23. The camera stabilizer in claim 22 further comprising a mounting shoe on one or more of said one or more vertically disposed extensions.

24. The camera stabilizer in claim 13 further comprising an attaching member on the bottom of said base, said attaching member adapted to receive said second support means.

25. The camera stabilizer in claim 24 wherein said second support means further comprises a telescoping rod having at one end a clamping device adapted on securingly attach to said removably attaching member and having at a second end a means for attaching said second end to a user.

26. The camera stabilizer in claim 25 wherein said one end is swivelable on said telescoping rod.

27. The camera stabilizer in claim 25 wherein said second end is swivelable on said telescoping rod.

28. The camera stabilizer in claim 13 wherein said first rod is a telescoping rod permanently attached to said first support means and wherein said base comprises a receiving aperture at its rear adapted to receive said first rod therethrough.

29. The camera stabilizer in claim 28 wherein said base further comprises a second receiving aperture at its front adapted to receive said first rod therethrough to thereby stabilize said first rod onto said base.

30. The camera stabilizer in claim 29 further comprising an attachably removable stopper adapted to securely fit over an exposed end said first rod, said exposed end extending frontward of said base through said second receiving aperture.

31. The camera stabilizer in claim 30 further comprising a second stopper on said first rod, said second stopper adapted to fit onto said first rod at a point which prevents said first rod from moving forward after insertion into said receiving aperture and permitting the exposed end to pass through said second receiving aperture.

32. The camera stabilizer in claim 28 wherein said first rod comprises a locking device thereon to lock said first rod into any position into which said first rod is telescoped.

33. A camera stabilizer for use with a camera, said camera stabilizer comprising:
a base having a top, a bottom, a front, and a rear;
a first rod extendable from said base, wherein said first rod is a telescoping rod;
first support means for providing support for the base, said first rod permanently attached to said first support means;
second support means for providing support for the base, said second support means comprising a second rod attached to and extending from said base;
leveling means on said base for establishing a proper horizontal frame of reference; and
and wherein said base further comprises a receiving aperture at its rear and a second receiving aperture at its front, each adapted to receive said first rod therethrough to thereby stabilize said first rod onto said base.

34. The camera stabilizer in claim 33 wherein said leveling means comprises a bubble level at the rear of said base.

35. The camera stabilizer in claim 33 further comprising a tripod mounting shoe attachable to the bottom of said base.

36. The camera stabilizer in claim 33 wherein said first support means is comprised of a soft material and is contoured to fit on a user's shoulder.

37. The camera stabilizer in claim 33 wherein said first support means further comprises a coupling means for receiving and securely holding an external object.

38. The camera stabilizer in claim 33 further comprising reflection means for reflecting and directing a photosensor transmitting signal from a remote control device for the camera to a corresponding photosensor receiver on the camera.

39. The camera stabilizer in claim 38 wherein said reflection means comprises a mirror attached to the front of said base.

40. The camera stabilizer in claim 33 further comprising one or more upstanding handles on said base.

41. The camera stabilizer in claim 40 further comprising gripping means on said one or more upstanding handles, said gripping means for aiding a user in holding and supporting the camera stabilizer.

42. The camera stabilizer in claim 40 further comprising one or more vertically disposed extensions on said one or more upstanding handles.

43. The camera stabilizer in claim 42 further comprising a mounting shoe on one or more of said one or more vertically disposed extensions.

44. The camera stabilizer in claim 33 further comprising an attaching member on the bottom of said based, said attaching member adapted to receive said second support means.

45. The camera stabilizer in claim 44 wherein said second support means further comprises a telescoping rod having at one end a clamping device adapted to securingly attach to said attaching member and having at a second end a means for attaching said second end to a user.

46. The camera stabilizer in claim 45 wherein said one end is swivelable on said telescoping rod.

47. The camera stabilizer in claim 45 wherein said second end is swivelable on said telescoping rod.

48. The camera stabilizer in claim 33 wherein said first rod is a telescoping rod permanently attached to said base and wherein said first support means further comprises a receiving member on said first support means wherein said receiving member is adapted to receive and secure said first rod therein.

49. The camera stabilizer in claim 48 wherein said first support means further comprises an adjustment member on its front end adapted to facilitate telescoping movement, back and forth, of said first rod.

50. The camera stabilizer in claim 33 further comprising an attachably removable stopper adapted to securely fit over an exposed end said first rod, said exposed end extending frontward of said base through said second receiving aperture.

51. The camera stabilizer in claim 50 further comprising a second stopper on said first rod, said second stopper adapted to fit onto said first rod at a point which prevents said first rod from moving forward after insertion into said receiving aperture and permitting the exposed end to pass through said second receiving aperture.

52. The camera stabilizer in claim 33 wherein said first rod comprises a locking device thereon to lock said first rod into any position into which said first rod is telescoped.

* * * * *